(12) United States Patent
Srivastava

(10) Patent No.: US 11,388,075 B2
(45) Date of Patent: Jul. 12, 2022

(54) PER SERVICE MICROBURST MONITORING SYSTEMS AND METHODS FOR ETHERNET

(71) Applicant: Ciena Corporation, Hanover, MD (US)

(72) Inventor: Vaibhav Srivastava, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/140,238

(22) Filed: Jan. 4, 2021

(65) Prior Publication Data
US 2022/0158922 A1    May 19, 2022

(30) Foreign Application Priority Data
Nov. 18, 2020   (IN) .............................. 202011050146

(51) Int. Cl.
| | |
|---|---|
| *H04L 43/10* | (2022.01) |
| *H04L 47/215* | (2022.01) |
| *H04L 49/50* | (2022.01) |
| *H04L 49/351* | (2022.01) |
| *H04L 47/625* | (2022.01) |

(52) U.S. Cl.
CPC ............ *H04L 43/10* (2013.01); *H04L 47/215* (2013.01); *H04L 49/351* (2013.01); *H04L 49/501* (2013.01); *H04L 47/627* (2013.01)

(58) Field of Classification Search
CPC ........... H04L 43/100894; H04L 49/351; H04L 49/501; H04L 47/215; H04L 47/225; H04L 47/36; H04L 47/627; H04L 47/808; H04L 12/28; H04L 12/70
See application file for complete search history.

(56) References Cited

U.S. PATENT DOCUMENTS

| | | | | |
|---|---|---|---|---|
| 7,830,796 | B2 * | 11/2010 | Chen ..................... | H04L 47/215 370/230.1 |
| 2010/0061266 | A1 * | 3/2010 | Bugenhagen ....... | H04L 43/0888 370/253 |
| 2011/0096666 | A1 * | 4/2011 | Davari .................... | H04L 47/10 370/235 |
| 2013/0242742 | A1 * | 9/2013 | Nishimura .............. | H04L 47/20 370/235.1 |
| 2017/0208009 | A1 * | 7/2017 | Agarwal ................ | H04L 47/215 |
| 2020/0127932 | A1 | 4/2020 | Srivastava et al. | |
| 2020/0274811 | A1 | 8/2020 | Srivastava et al. | |

* cited by examiner

*Primary Examiner* — Mohamed A Kamara
(74) *Attorney, Agent, or Firm* — Clements Bernard Baratta; Lawrence A. Baratta, Jr.; Christopher L. Bernard

(57) ABSTRACT

Systems and methods in a node in an Ethernet network include, responsive to enabling burst monitoring between the node and a peer node in the Ethernet network, obtaining rate and burst size information from the peer node; configuring a counter at a traffic disaggregation point based on the rate and the burst size information, wherein the counter is based on a dual token bucket that is used to count out-of-profile frames in excess of a Committed Information Rate (CIR); and detecting a burst based on the out-of-profile frames during a monitored time interval.

18 Claims, 4 Drawing Sheets

PER SERVICE MICROBURST MONITORING SYSTEMS AND METHODS FOR ETHERNET

FIELD OF THE DISCLOSURE

The present disclosure generally relates to networking. More particularly, the present disclosure relates to per service microburst monitoring systems and methods for Ethernet.

BACKGROUND OF THE DISCLOSURE

Microbursts are traffic with high speed for a very short period of time, and it is very common in real-time network traffic. The generation of microbursts in the network can be due to many reasons; one reason could be where bandwidth is aggregated from the several input ports or due to network congestion. For example, when traffic from multiple 1 G (where G is gigabits per second) ports are aggregated at a 10 G port, there is a possibility of a burst because 1 G and 10 G ports are running at a different clock speed. Whereas in case of congestion where it requires traffic buffering can also cause traffic burst generation. For example, microbursts are described in commonly-assigned U.S. patent application Ser. No. 16/379,845, filed Apr. 10, 2019, and entitled "Weighted random early detection improvements to absorb microbursts," the contents of which are incorporated by reference in their entirety.

In general, network operators are puzzled about the traffic's burstiness, and there are questions about how to configure the allowable burst size in the network based on the real-time traffic pattern. In many scenarios, it is seen that network operators have reported a loss in traffic, and, on further analysis, it is found that the traffic is dropped because of the burstiness in the traffic. Network operators want to check if the dropped traffic is due to a burst in the network or some other condition. There is a desire to monitor the burstiness of the network traffic.

As these bursts are just a sudden change in bit placement over time, it is hard to monitor these bursts using software tools. Software tools generally monitor the traffic in the range of 1 to 5 seconds, and these microbursts are very small, so either a special software mechanism or hardware is needed to monitor the traffic in the range of milliseconds or microseconds. That is, the short period of time for the microbursts is in the range of milliseconds or microseconds. For conventional microburst monitoring, special hardware is required to detect the microbursts, but that is not sufficient to identify the service level microbursts. There is no solution to monitor the end-to-end burst per service level.

BRIEF SUMMARY OF THE DISCLOSURE

The present disclosure relates to per service microburst monitoring systems and methods for Ethernet. The present disclosure includes monitoring the network burst transmitted between ingress and egress Ethernet endpoints per service level. Burst monitoring is performed based on the configured or allowable burst from the ingress endpoint and received at the egress endpoint. The approach described herein is built using the Maintenance Endpoint (MEP) as defined in IEEE 802.1ag Connectivity Fault Management (CFM) protocol and dual token bucket algorithm. The CFM protocol is described, e.g., in "IEEE Standard for Local and Metropolitan Area Networks Virtual Bridged Local Area Networks Amendment 5: Connectivity Fault Management," in IEEE Std 802.1ag—2007 (Amendment to IEEE Std 802.1Q—2005 as amended by IEEE Std 802.1ad—2005 and IEEE Std 802.1ak—2007), vol., no., pp.1-260, 17 Dec. 2007, doi: 10.1109/IEEESTD.2007.4431836, the contents of which are incorporated by reference in their entirety. The approach described herein includes the automatic exchange of allowed burst and rate information between the endpoints and monitoring of bidirectional bursts in the network. Exchange of such information between the endpoints will allow the detection of only those bursts which are unexpected or breaching a Service Layer Agreement (SLA). The granularity proposed herein is per Service level. It is also possible to raise an alarm and/or provide a notification about the traffic pattern's burstiness even if there is no frame loss in the network. This will help network operators better understand the real-time network traffic pattern. Continuous monitoring will help in adjusting network settings to avoid any SLA miss. This will also help network operators understand if the loss of traffic is because of the burst in the network or due to some other reasons and help isolate the network, which is causing traffic bursts.

In an embodiment, a node in an Ethernet network includes a plurality of ports; and circuitry configured to, responsive to enabling burst monitoring between the node and a peer node in the Ethernet network, obtain rate and burst size information from the peer node, configure a counter at a traffic disaggregation point based on the rate and the burst size information, wherein the counter is based on a dual token bucket that is used to count out-of-profile frames in excess of a Committed Information Rate (CIR), and detect a burst based on the out-of-profile frames during a monitored time interval. The counter can be configured at a Network-Network Interface (NNI) port for the traffic disaggregation point, and the rate and burst size information can be obtained at a Maintenance Endpoint (MEP) configured on a User-Network Interface (UNI) port. The burst can be detected at a service level where the service level is per UNI port. The circuitry can be further configured to perform a loss measurement between the MEP at the node and a corresponding MEP at the peer node, and responsive to a loss in the loss measurement, determine whether there is the burst.

The circuitry can be further configured to send a burst monitoring message to the peer node, obtain counter values from the peer node, and detect a burst at the peer node based on corresponding out-of-profile frames, from the counter values from the peer node, during a monitored time interval. The counter can be a first counter associated with a first service associated with the rate and burst size information, and wherein the circuitry can be further configured to obtain second rate and burst size information for a second service, configure a second counter at the traffic disaggregation point based on the second rate and burst size information, and detect a burst on the second service based on corresponding out-of-profile frames during a monitored time interval. The dual token bucket can be used for counting instead of modifying traffic.

In other embodiments, a method includes steps and a non-transitory computer-readable medium includes instructions stored thereon for programming a node in an Ethernet network to perform the steps. The steps include, responsive to enabling burst monitoring between the node and a peer node in the Ethernet network, obtaining rate and burst size information from the peer node; configuring a counter at a traffic disaggregation point based on the rate and the burst size information, wherein the counter is based on a dual token bucket that is used to count out-of-profile frames in excess of a Committed Information Rate (CIR); and detecting a burst based on the out-of-profile frames during a monitored time interval. The counter can be configured at a Network-Network Interface (NNI) port for the traffic disaggregation point, and the rate and burst size information can be obtained at a Maintenance Endpoint (MEP) configured on a User-Network Interface (UNI) port. The burst can be detected at a service level where the service level is per UNI port.

The steps can further include performing a loss measurement between the MEP at the node and a corresponding MEP at the peer node; and responsive to a loss in the loss measurement, determining whether there is the burst. The steps can further include sending a burst monitoring message to the peer node, obtaining counter values from the peer node, and detecting a burst at the peer node based on corresponding out-of-profile frames, from the counter values from the peer node, during a monitored time interval. The counter can be a first counter associated with a first service associated with the rate and burst size information, and wherein the steps can further include obtaining second rate and burst size information for a second service; configuring a second counter at the traffic disaggregation point based on the second rate and burst size information; and detecting a burst on the second service based on corresponding out-of-profile frames during a monitored time interval. The dual token bucket can be used for counting instead of modifying traffic.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to per service microburst monitoring systems and methods for Ethernet. The present disclosure includes monitoring the network burst transmitted between ingress and egress Ethernet endpoints per service level. Burst monitoring is performed based on the configured or allowable burst from the ingress endpoint and received at the egress endpoint. The approach described herein is built using the Maintenance Endpoint (MEP) as defined in IEEE 802.1ag Connectivity Fault Management (CFM) protocol and dual token bucket algorithm. The approach described herein includes the automatic exchange of allowed burst and rate information between the endpoints and monitoring of bidirectional bursts in the network. Exchange of such information between the endpoints will detect only those bursts that are unexpected or breaching a Service Layer Agreement (SLA). The granularity proposed herein is per Service level. It is also possible to raise an alarm and/or provide a notification about the traffic pattern's burstiness even if there is no frame loss in the network. This will help network operators better understand the real-time network traffic pattern. Continuous monitoring will help in adjusting network settings to avoid any SLA miss. This will also help network operators understand if the loss of traffic is because of the burst in the network or due to some other reasons and help isolate the network, which is causing traffic bursts.

Network Configuration for Burst Monitoring

Figure 1:
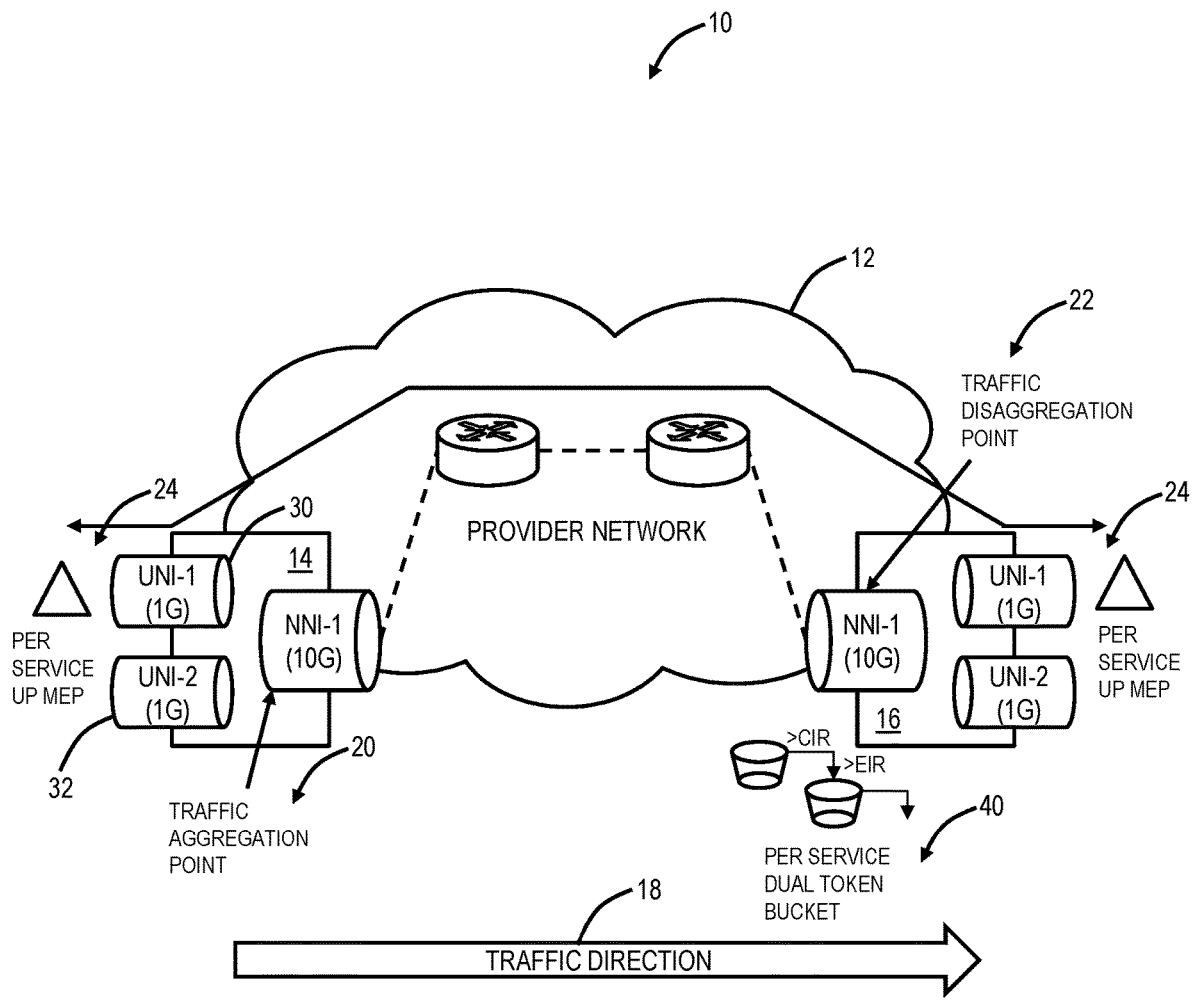
FIG. 1 is a block diagram of a network including a provider network and two endpoint nodes.

FIG. 1 is a block diagram of a network 10, including a provider network 12 and two endpoint nodes 14, 16. The network 10 and the provider network 12 utilize Ethernet, and the provider network 12 is illustrated as a cloud and can include various additional network elements for interconnecting the endpoint nodes 14, 16. Those skilled in the art will recognize the networks 10, 12 are presented for illustration purposes, and various other configurations are possible consistent with the systems and methods described herein. In the example of FIG. 1, traffic is illustrated from the ingress node 14 to the egress node 16, i.e., a traffic direction 18. For illustration purposes, the network 10 includes two 1 G (again where G is gigabits per second) User-Network Interface (UNI) ports, labeled as UNI-1 and UNI-2, and one Network-Network Interface (NNI) port, labeled as NNI-1. The node 14 includes a traffic aggregation point 20 for the UNI-1, UNI-2 to the NN-1, and the node 16 includes a traffic disaggregation point 22 for the NNI-1 to the UNI-1, UNI-2. Also, the nodes 14, 16 each include a per service (per UNI) UP Maintenance Endpoint (MEP) 24. As is known in the art, the UP MEPs 24 are configured to generate and process CFM Protocol Data Units (PDUs) for service-level monitoring. UP MEP functionality is widely used by service providers to monitor the end-to-end operation of Layer 2 services at the entry and exit of their maintenance domains. As described herein, the term service refers to an Ethernet service that is monitored by the UP MEPs 24. For example, in FIG. 1, example services 30, 32 are the two UNIs, UNI-1, UNI-1.

Burst formation for a service 30, 32 could be anywhere in the provider's network 12. When the traffic reaches the node 16 and, if a burst is formed anywhere between the nodes 14, 16, it should be detected at the node 16, which is the egress point for the service 30, 32. The present disclosure includes a burst monitoring process that is enabled and started between the endpoint nodes 14, 16. The configured rate and burst information are exchanged via special control messages between the two endpoints nodes, e.g., via CFM PDUs between the UP MEPs 24. As described herein, the burst information can be the Committed Burst Size (CBS) or the Excess Burst Size (EBS). If there is no meter (policer) configured, then it will be assumed that the traffic can ingress up to maximum ingress port speed, and the same is communicated from the ingress node 14 to the other ethernet endpoint node 16. Once both the Ethernet endpoint nodes 14, 16 have the allowed rate and burst information of the other node, they can start monitoring the number of frames exceeding the ingress rate or allowable burst limit over the small-time interval T.

For illustration, the node 16 is shown with a per service dual token bucket process 40 implemented thereon. That is, the per service dual token bucket process 40 is placed at the disaggregation point 22. Out of profile frames mentioned here are frames ingressing at the disaggregation point 22 and switched towards the egress Ethernet endpoint node 16 that are over and above the allowed rate and burst at the ingress Ethernet endpoint node 14. These frames will be counted using the dual token bucket process 40 at the disaggregation point 22. However, there will not be any modification in the traffic due to the dual token bucket process 40; rather, the dual token bucket process 40 is used herein for counting and not for modifying the frames.

To exchange the rate and burst information, the present disclosure includes the UP MEPs 24, as defined in IEEE 802.1ag. Burst monitoring is performed per service, between two UNI ports. However, once the allowed burst information is exchanged, frames are counted at the peer endpoint (the disaggregation point 22) using the per service dual token bucket process 40. Here, the number of excess frames at the NNI, which will be egressed out from the UP MEP 24 (at UNI port) are counted.

The burst monitoring includes exchanging rate and allowed burst information between the endpoint nodes 14, 16, e.g., here from the node 14 to the node 16, but this can also be performed in the opposite direction bidirectional burst monitoring. The burst monitoring also includes exchanging in-profile and out-of-profile counter values at the Tx endpoint between both the endpoint nodes 14, 16. The exchange of information can be done using Ethernet Vendor Specific Operations, Administration, and Maintenance (OAM) frames as defined in IEEE 802.1ag.

Frame Counting Via a Dual Token Bucket Process

Figure 2:
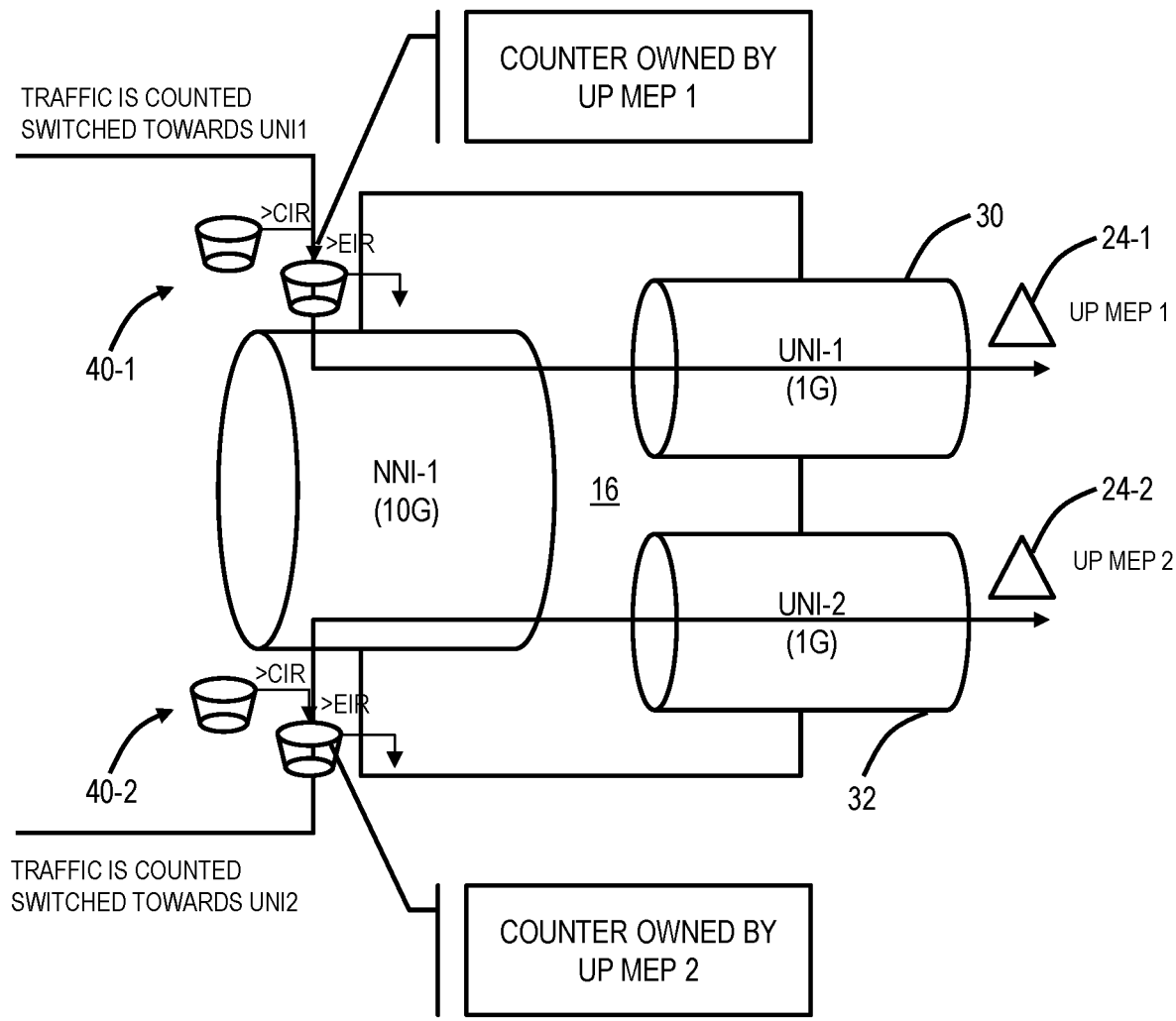
FIG. 2 is a block diagram of an egress endpoint node illustrating counter placement via per service dual token bucket processes.

FIG. 2 is a block diagram of an egress endpoint node 16 illustrating counter placement via per service dual token bucket processes 40-1, 40-2. FIG. 2 shows additional details for the egress endpoint node 16 from FIG. 1. Here, in this example, there are two per service dual token bucket processes 40-1, 40-2, for the services 30, 32 that each includes corresponding UP MEPs 24-1, 24-2. The per service dual token bucket processes 40-1, 40-2 are counters. The burst monitoring will collect the counter values (in-profile and out-of-profile) for the service frames received at the disaggregation point 22 and switched towards the port on which the UP MEPs 24-1, 24-2 are created. Counters are placed at ingress port for per service and per out port on which the UP MEP 24 is created.

Again, the per service dual token bucket processes 40-1, 40-2 are used herein to count frames and not for traffic shaping. The per service dual token bucket processes 40-1, 40-2 is configured to count frames, including frames that are greater than a Committed Information Rate (CIR) and frames that are greater than an Excess Information Rate (EIR). As described herein, in-profile counter values include a count of frames less than the EIR (and the CIR), and out-of-profile counter values include a count of frames greater than the CIR.

Bidirectional Traffic

This approach can be extended to monitor bursts for bidirectional traffic where a single node will monitor for bursts for the peer endpoint node as well, e.g., the node 16 can monitor for bursts locally and at the node 14. The number of frames transmitted and received by the pair of endpoints might be the same, but the out-of-profile counter at the Tx endpoint will be used for any burst identification.

The out-of-profile counter will count all the frames which are part of multiple bursts during the monitor time interval. When burst monitoring is performed for bidirectional traffic, one node 14 will act as an "initiator," and the peer node 16 will act as "responder." The initiator node will generate the message frame, which may be referred to as a Burst Monitoring Message (BMM), and, on receiving it at the responder node, the responder node gets the counter values for the associated service and generates a Burst Monitoring Response (BMR). When the initiator node receives the BMR message, it calculates if any burst has been detected at the peer node (responder node) and on its own (initiator node) by comparing the counter values from the previous time interval during the time interval $\Delta T$.

The following are used to detect the burst at the far end device, which is the responder node:

$$\text{Burst}_{\Delta T}^{far\text{-}end} = \text{Out Of Profile Frames}_T^{far\text{-}end} - \text{Out Of Profile Frames}_{T-1}^{far\text{-}end}$$

And on the initiator node:

$$\text{Burst}_{\Delta T}^{near\text{-}end} = \text{Out Of Profile Frames}_T^{near\text{-}end} - \text{Out Of Profile Frames}_{T-1}^{near\text{-}end}$$

In each per service dual token bucket process 40, there are two buckets or counters for in-profile frames (less than the CIR) and out-of-profile frames (greater than the CIR). The present disclosure utilizes the dual token bucket process 40 for the counters instead of for shaping or policing traffic. The detection of a burst is done by the dual token bucket process 40 with out-of-profile frames. The buckets or counters are configured with the rates and burst values from the service's peer node, which is being monitored, where the rates and burst values are exchanged one time or whenever values are modified. The rates can be CIR and the burst values can be CBS.

For example, if the allowed rate and burst are 100 Mbps and 16K, respectively, for a service then the in-profile token bucket will be configured with 100 Mbps (CIR) and 16K (CBS), and anything above this allowed configuration will be counted by the out-of-profile bucket counter and will be considered as a burst. The monitored time interval, $\Delta T$, is between times T and T-1. Using the equations above, assume at a time (T-1) the counter value is 1050K and at a time (T) its value changes to 1150K then during $\Delta T$, the burst is detected as 100K and for the next time interval, the reference counter value will be 1150K. Whereas if the counter values are the same during the $\Delta T$, then no burst is detected during that delta T. This 100K indicates a burst has been detected since 100K is greater than the CBS of 16K. Bursts can also be less than 16K, but this example shows one above the allowed CBS of 16K.

Data Exchange

To avoid unnecessary frame exchanges between the initiator and responder nodes at every small-time interval T, both nodes 14, 16 can use the same approach to detect the burst locally. Even though burst monitoring will be done locally, such as continuously while the burst monitoring is enabled, the rate and burst information of the peer device should be exchanged from time to time, e.g., periodically, or at least whenever the configuration changes. A change in the configuration of the rate or burst information will trigger a reconfiguration of the counters at both endpoint nodes 14, 16. The burst detection time interval should also be the same on both the endpoint nodes 14, 16. This out-of-band technique for burst detection will save the actual network bandwidth, but as the information is not exchanged every time interval (T), both the endpoints may get out of synchronization if no Continuity Check Messages (CCMs) are also running.

The burst monitoring described herein can be referred to as in-band and out-of-band monitoring. The in-band monitoring includes where the node 16 monitors bursts locally but has received rate or burst information from the other node 14. The in-band monitoring is configured to detect bursts locally at a node. The out-of-band monitoring includes the bidirectional monitoring where the BMM and BMR messages are used.

The use of in-band and out-of-band monitoring is based on actual network conditions and configurations. The approach described herein can also be used for per service per Class of Service (CoS). With per service per CoS monitoring, the counters will be placed per service per CoS. If loss measurement is also running between the endpoint nodes 14, 16, the present disclosure can be used to determine if a loss is because of a burst.

Burst Monitoring Process

Figure 3:
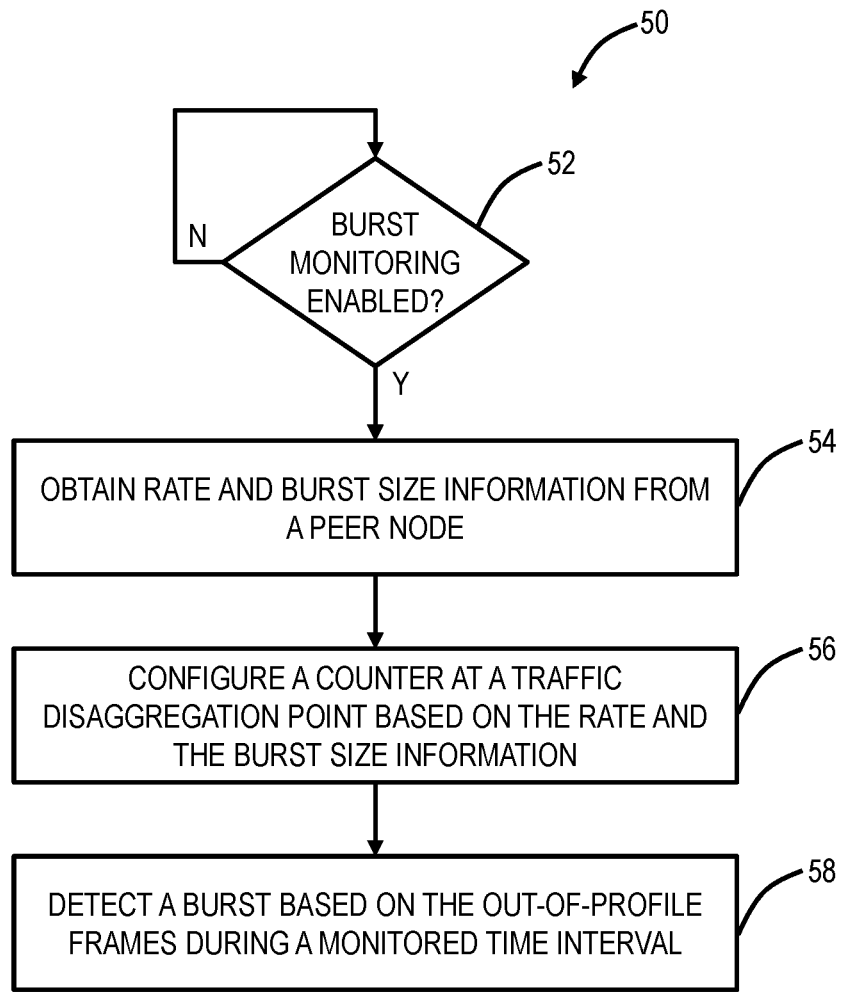
FIG. 3 is a flowchart of a burst monitoring process implemented at a node in an Ethernet network.

FIG. 3 is a flowchart of a burst monitoring process 50 implemented at a node in an Ethernet network. That is, the burst monitoring process 50 can be implemented at the node 16, as a method, and a non-transitory computer-readable medium having instructions stored thereon for programming the node 16.

The burst monitoring process 50 includes, responsive to enabling burst monitoring between the node and a peer node in the Ethernet network (step 52), obtaining rate and burst size information from the peer node (step 54); configuring a counter at a traffic disaggregation point based on the rate and the burst size information (step 56), wherein the counter is based on a dual token bucket that is used to count out-of-profile frames in excess of a Committed Information Rate (CIR); and detecting a burst based on the out-of-profile frames during a monitored time interval (step 58).

The counter is configured at a Network-Network Interface (NNI) port for the traffic disaggregation point, and the rate and burst size information is obtained at a Maintenance Endpoint (MEP) configured on a User-Network Interface (UNI) port. The burst can be detected at a service level where the service level is per UNI port. The burst monitoring process 50 can further include performing a loss measurement between the MEP at the node and a corresponding MEP at the peer node; and responsive to a loss in the loss measurement, determining whether there is the burst.

The burst monitoring process 50 can further include sending a burst monitoring message to the peer node, obtaining counter values from the peer node, and detecting a burst at the peer node based on corresponding out-of-profile frames, from the counter values from the peer node, during a monitored time interval.

The counter can be a first counter associated with a first service associated with the rate and burst size information, and the burst monitoring process 50 can further include obtaining second rate and burst size information for a second service; configuring a second counter at the traffic disaggregation point based on the second rate and burst size information; and detecting a burst on the second service based on corresponding out-of-profile frames during a monitored time interval.

Again, the dual token bucket is used for counting instead of modifying the traffic (i.e., dropping frames).

The burst monitoring process 50 can be used to do further analysis based on samples collected per time interval T, such as how much is the service is congested during which time of the day or the average time the network was congested, how many times the SLA was missed because of the burstiness in the network, etc. Burst detection bins can be maintained on the device (network node 14, 16), i.e., the counter values, and can be used for further analysis by a management system, such as an Element Management System (EMS) or Network Management System (NMS).

Burst detection data can be maintained in historical bins. These bins can be maintained for average burst, peak burst, or other informative and useful form. As burst detection data is retrieved for very small-time intervals, storing it in history bins for further analysis is recommended.

Burst detection for any service gives a chance to handle further or repetitive bursts in the network. Burst detection gives an early sign of traffic loss due to congestion, and the network can be reconfigured based on the burst detection data as proposed here. Burst can be handled by allowing more packet buffers for the service at the egress node for which burst is detected. Burst detection also gives a fair understanding of traffic loss because of unexpected burst in the network breaching the SLA or some other reasons.

Example Node

Figure 4:
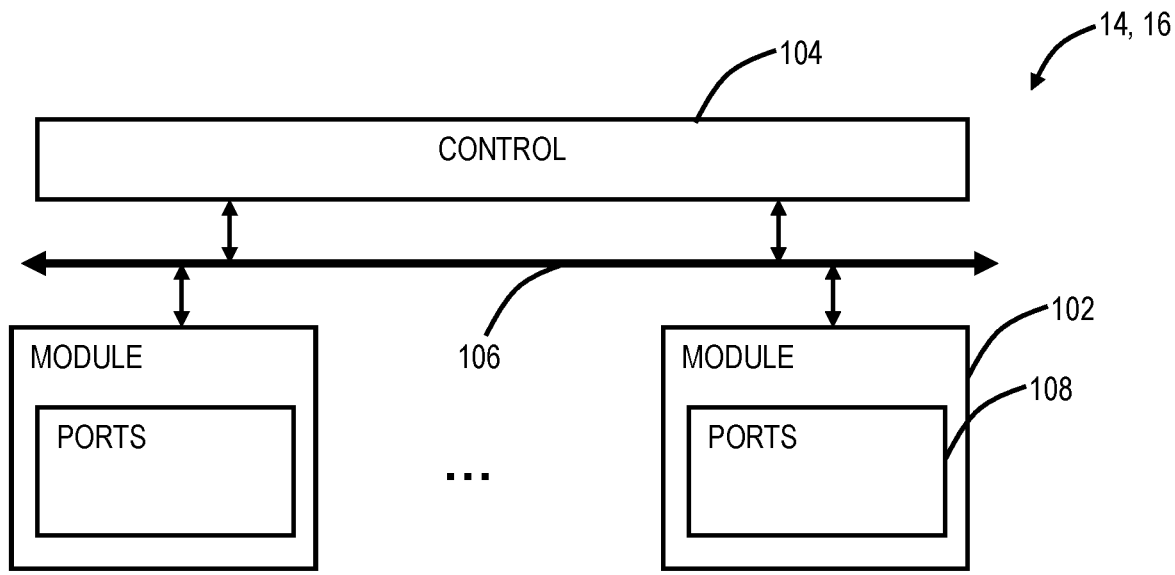
FIG. 4 is a block diagram of an example implementation of a node.

FIG. 4 is a block diagram of an example implementation of a node 14, 16. Those of ordinary skill in the art will recognize FIG. 4 is a functional diagram in an oversimplified manner, and a practical embodiment may include additional components and suitably configured processing logic to support known or conventional operating features that are not described in detail herein. In an embodiment, the node 14, 16 is a packet switch, but those of ordinary skill in the art will recognize the systems and methods described herein can operate with other types of network elements and other implementations. In this embodiment, the node 14, 16 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the node 14, 16. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the node 14, 16 out by the correct port 108 to the next node 14, 16. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the node 14, 16. The network interface may be utilized to communicate with an element manager, a network management system, etc. Additionally, the control module 104 can include a database that tracks and maintains provisioning, configuration, operational data, and the like.

Again, those of ordinary skill in the art will recognize the node 14, 16 can include other components which are omitted for illustration purposes, and that the systems and methods described herein are contemplated for use with a plurality of different network elements with the node 14, 16 presented as an example type of network element. For example, in another embodiment, the node 14, 16 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 4 is meant to provide a functional view, and those of ordinary skill in the art will recognize actual hardware implementations may vary.

Example Controller

Figure 5:
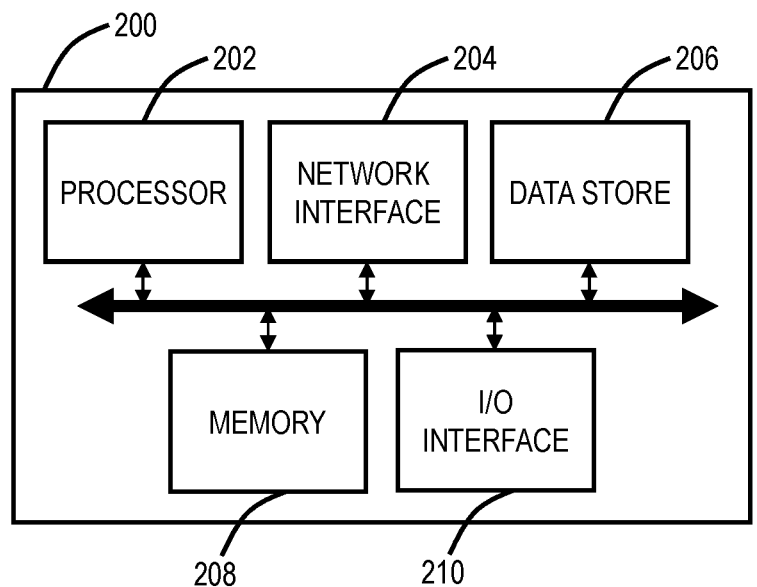
FIG. 5 is a block diagram of an example controller, which can form a controller for the node of FIG. 4.

FIG. 5 is a block diagram of an example controller 200, which can form a controller for the node 14, 16. The controller 200 can be part of the node 14, 16, or a stand-alone device communicatively coupled to the node 14, 16. Also, the controller 200 can be referred to in implementations as a control module, a shelf controller, a shelf processor, a system controller, etc. The controller 200 can include a processor 202, which is a hardware device for executing software instructions. The processor 202 can be any custom made or commercially available processor, a central processing unit (CPU), an auxiliary processor among several processors associated with the controller 200, a semiconductor-based microprocessor (in the form of a microchip or chipset), or generally any device for executing software instructions. When the controller 200 is in operation, the processor 202 is configured to execute software stored within the memory, to communicate data to and from the memory, and to generally control operations of the controller 200 pursuant to the software instructions. The controller 200 can also include a network interface 204, a data store 206, memory 208, an I/O interface 210, and the like, all of which are communicatively coupled to one another and to the processor 202.

The network interface 204 can be used to enable the controller 200 to communicate on a data communication network, such as to communicate to a management system, to the nodes 14, 16, and the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the controller 200 to communicate with other devices.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A node in an Ethernet network, comprising:
   a plurality of ports; and
   circuitry configured to
   responsive to enabling burst monitoring between the node and a peer node in the Ethernet network, obtain rate and burst size information from the peer node,
   configure a counter at a traffic disaggregation point based on the rate and the burst size information, wherein the counter is based on a dual token bucket that is used to count out-of-profile frames in excess of a Committed Information Rate (CIR), detect a burst based on the out-of-profile frames during a monitored time interval, send a burst monitoring message to the peer node, obtain counter values from the peer node, and detect the burst at the peer node based on corresponding out-of-profile frames, from the counter values from the peer node, during a monitored time interval.

2. The node of claim 1, wherein the counter is configured at a Network-Network Interface (NNI) port for the traffic disaggregation point, and the rate and burst size information is obtained at a Maintenance Endpoint (MEP) configured on a User-Network Interface (UNI) port.

3. The node of claim 2, wherein the burst is detected at a service level where the service level is per UNI port.

4. The node of claim 2, wherein the circuitry is further configured to perform a loss measurement between the MEP at the node and a corresponding MEP at the peer node, and responsive to a loss in the loss measurement, determine whether there is the burst.

5. The node of claim 1, wherein the counter is a first counter associated with a first service associated with the rate and burst size information, and wherein the circuitry is further configured to obtain second rate and burst size information for a second service, configure a second counter at the traffic disaggregation point based on the second rate and burst size information, and detect a burst on the second service based on corresponding out-of-profile frames during a monitored time interval.

6. The node of claim 1, wherein the dual token bucket is used for counting instead of modifying traffic.

7. A non-transitory computer-readable medium having instructions stored thereon for programming a node in an Ethernet network to perform steps of:

responsive to enabling burst monitoring between the node and a peer node in the Ethernet network, obtaining rate and burst size information from the peer node;

configuring a counter at a traffic disaggregation point based on the rate and the burst size information, wherein the counter is based on a dual token bucket that is used to count out-of-profile frames in excess of a Committed Information Rate (CIR);

detecting a burst based on the out-of-profile frames during a monitored time interval;

sending a burst monitoring message to the peer mode, obtaining counter values from the peer node; and detecting the burst at the peer node based on corresponding out-of-profile frames, from the counter values from the peer node, during a monitored time interval.

8. The non-transitory computer-readable medium of claim 7, wherein the counter is configured at a Network-Network Interface (NNI) port for the traffic disaggregation point, and the rate and burst size information is obtained at a Maintenance Endpoint (MEP) configured on a User-Network Interface (UNI) port.

9. The non-transitory computer-readable medium of claim 8, wherein the burst is detected at a service level where the service level is per UNI port.

10. The non-transitory computer-readable medium of claim 8, wherein the steps further include performing a loss measurement between the MEP at the node and a corresponding MEP at the peer node; and responsive to a loss in the loss measurement, determining whether there is the burst.

11. The non-transitory computer-readable medium of claim 7, wherein the counter is a first counter associated with a first service associated with the rate and burst size information, and wherein the steps further include obtaining second rate and burst size information for a second service;

configuring a second counter at the traffic disaggregation point based on the second rate and burst size information; and detecting a burst on the second service based on corresponding out-of-profile frames during a monitored time interval.

12. The non-transitory computer-readable medium of claim 7, wherein the dual token bucket is used for counting instead of modifying traffic.

13. A node in an Ethernet network, comprising:

a plurality of ports; and circuitry configured to responsive to enabling burst monitoring between the node and a peer node in the Ethernet network, obtain rate and burst size information from the peer node, configure a counter at a traffic disaggregation point based on the rate and the burst size information, wherein the counter is based on a dual token bucket that is used to count out-of-profile frames in excess of a Committed Information Rate (CIR), and detect a burst based on the out-of-profile frames during a monitored time interval, wherein the counter is a first counter associated with a first service associated with the rate and burst size information, and wherein the circuitry is further configured to obtain second rate and burst size information for a second service, configure a second counter at the traffic disaggregation point based on the second rate and burst size information, and detect a burst on the second service based on corresponding out-of-profile frames during a monitored time interval.

14. The node of claim 1, wherein the counter is configured at a Network-Network Interface (NNI) port for the traffic disaggregation point, and the rate and burst size information is obtained at a Maintenance Endpoint (MEP) configured on a User-Network Interface (UNI) port.

15. The node of claim 2, wherein the burst is detected at a service level where the service level is per UNI port.

16. The node of claim 2, wherein the circuitry is further configured to perform a loss measurement between the MEP at the node and a corresponding MEP at the peer node, and responsive to a loss in the loss measurement, determine whether there is the burst.

17. The node of claim 1, wherein the circuitry is further configured to send a burst monitoring message to the peer node, obtain counter values from the peer node, and detect a burst at the peer node based on corresponding out-of-profile frames, from the counter values from the peer node, during a monitored time interval.

18. The node of claim 1, wherein the dual token bucket is used for counting instead of modifying traffic.

* * * * *